(12) United States Patent
Hamlin et al.

(10) Patent No.: US 11,245,847 B1
(45) Date of Patent: Feb. 8, 2022

(54) SYSTEM AND METHOD FOR MANAGING A CAMERA USING SYSTEM INPUTS

(71) Applicant: Dell Products L.P., Hopkinton, MA (US)

(72) Inventors: Daniel Lawrence Hamlin, Round Rock, TX (US); Vivek Viswanathan Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/070,501

(22) Filed: Oct. 14, 2020

(51) Int. Cl.
*H04N 5/232* (2006.01)
*G06F 1/3206* (2019.01)

(52) U.S. Cl.
CPC ..... *H04N 5/232411* (2018.08); *G06F 1/3206* (2013.01); *H04N 5/23225* (2013.01)

(58) Field of Classification Search
CPC . H04N 5/3698; H04N 1/00885–00907; H04N 5/23241–232411; H04N 13/0066; G03B 2217/007; G03B 7/26; G06F 1/3203–3296; G06F 17/30265; G06F 17/30268; G06F 17/3028; H02J 7/00–36; H02J 3/383; H02J 7/007; G08B 13/19671; G08B 13/19673; G08B 21/182; G08B 21/18; B60R 16/003; B60R 16/033
USPC .................................. 396/301–304; 348/372
See application file for complete search history.

(56) References Cited

U.S. PATENT DOCUMENTS

2017/0088072 A1* 3/2017 Curtis .................... G08B 31/00

* cited by examiner

*Primary Examiner* — Xi Wang
(74) *Attorney, Agent, or Firm* — Chamberlain, Hrdlicka, White, Williams & Aughtry

(57) ABSTRACT

An information handling system for providing computer implemented services to users includes a camera and a low power manager that manages operation of the camera. The information handling system also includes a storage for storing: context data regarding an operating state of the information handling system, and management policies for managing operation of the camera. The information handling system also includes a camera settings manager that dynamically updates operation of the low power manager using the context data and the management policies.

17 Claims, 8 Drawing Sheets

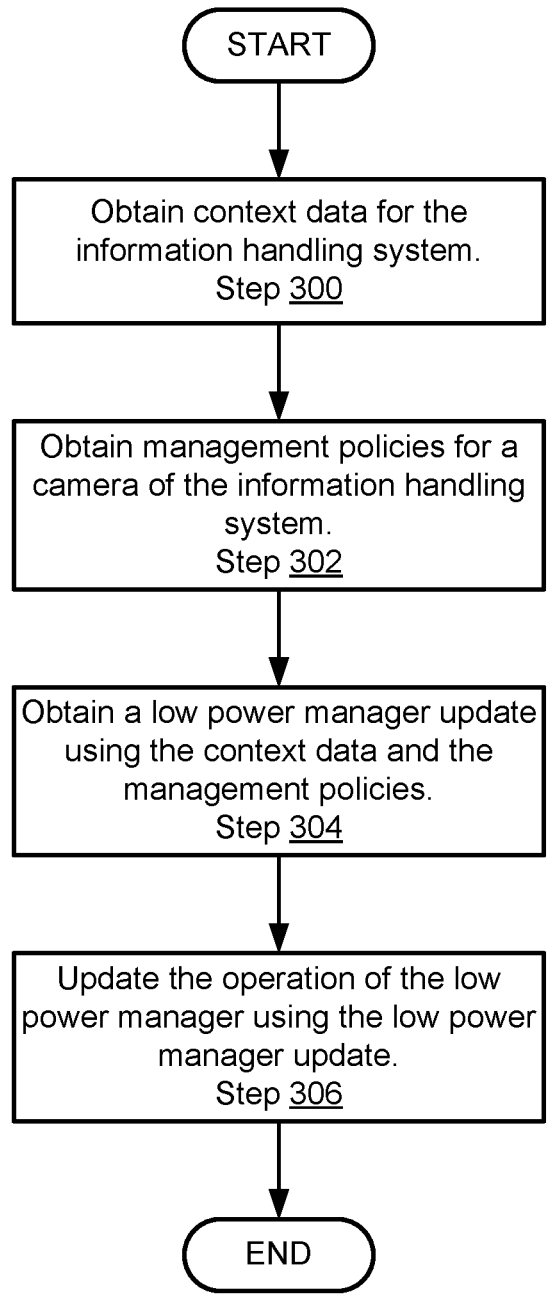
FIG. 3.1

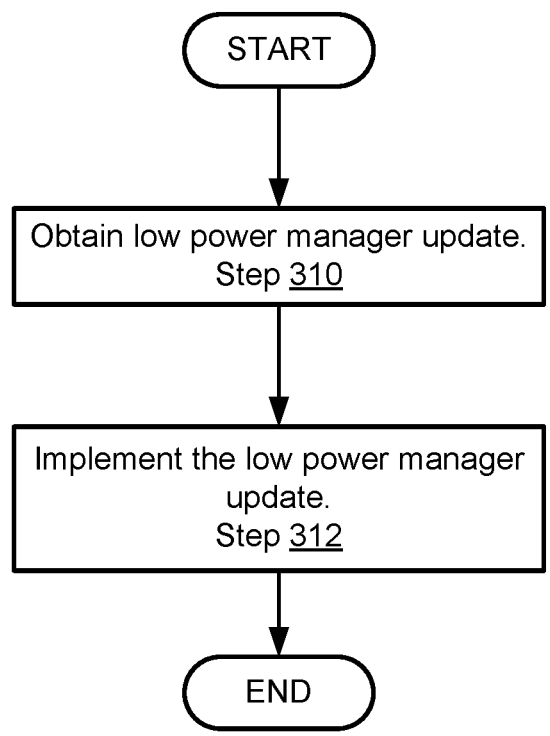
FIG. 3.2

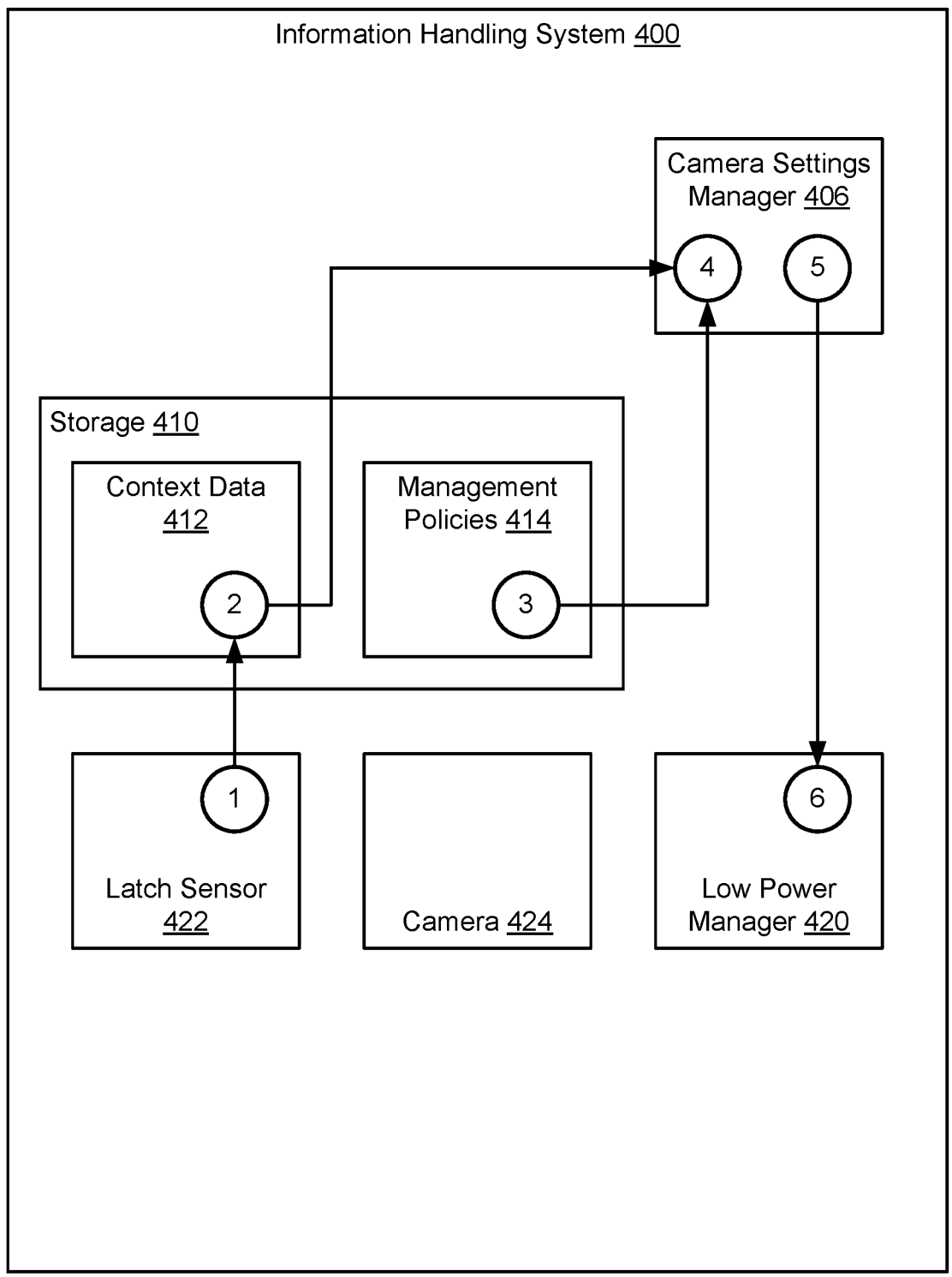
FIG. 4.1

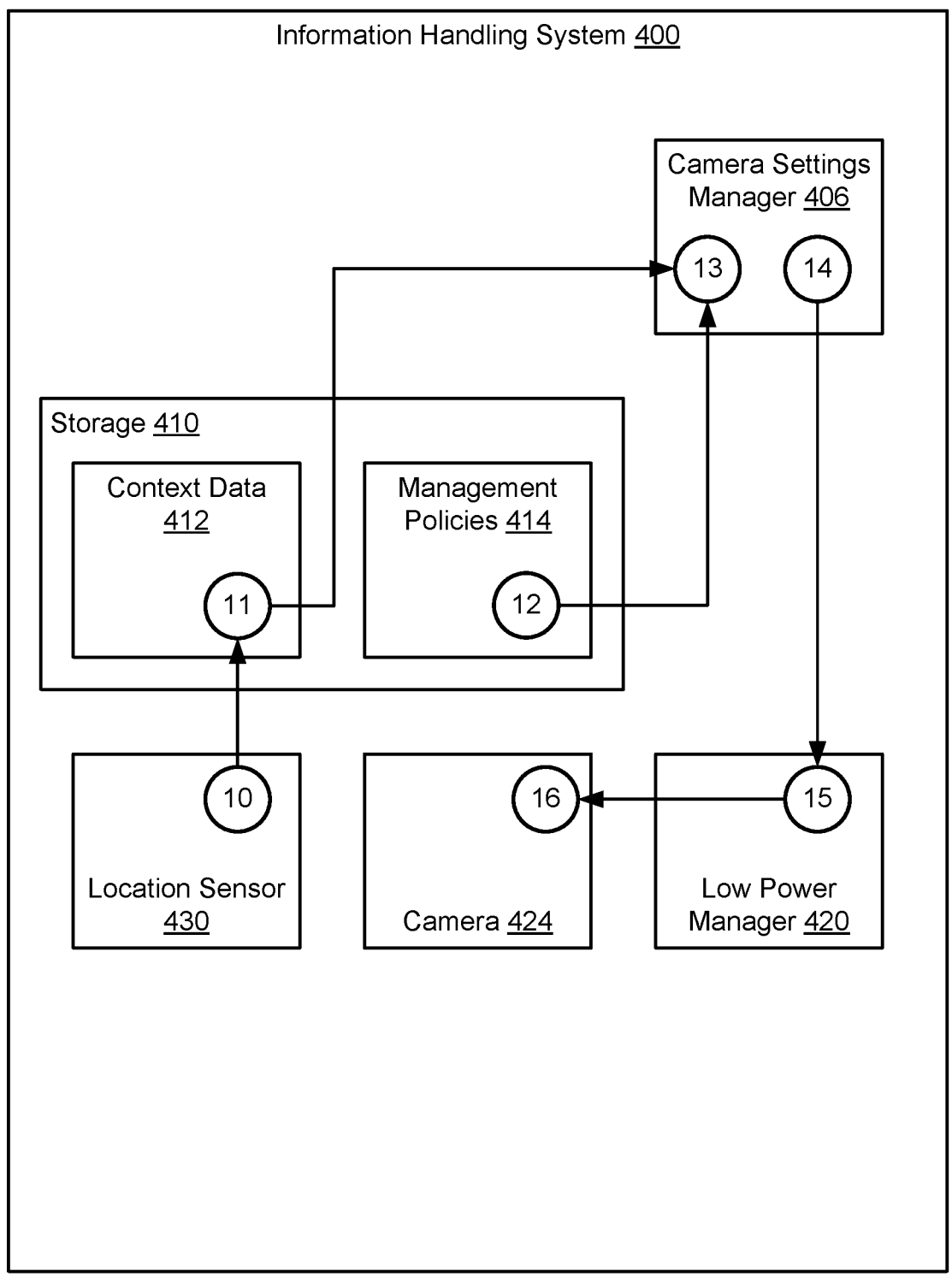
FIG. 4.2

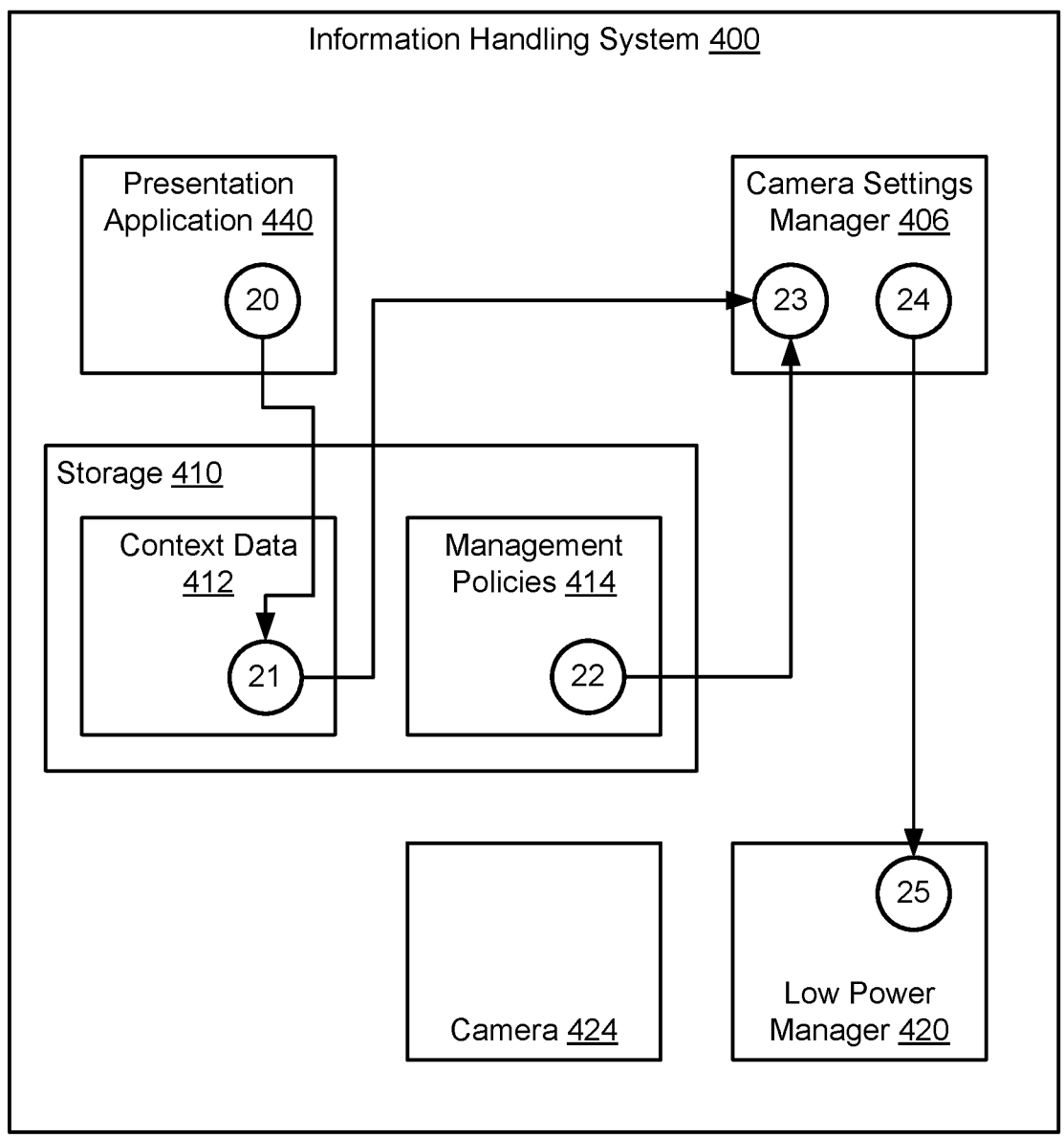
FIG. 4.3

SYSTEM AND METHOD FOR MANAGING A CAMERA USING SYSTEM INPUTS

BACKGROUND

Computing devices may provide services. To provide the services, the computing devices may include hardware components and software components. The operation of the hardware and software components may contribute to a quality of user experience of the computing devices.

SUMMARY

In one aspect, an information handling system for providing computer implemented services to users in accordance with one or more embodiments of the invention includes a camera; a low power manager that manages operation of the camera; a storage for storing: context data regarding an operating state of the information handling system, and management policies for managing operation of the camera; and a camera settings manager that dynamically updates operation of the low power manager using the context data and the management policies.

In one aspect, a method for managing operation of a camera of an information handling system using context data and management policies in accordance with one or more embodiments of the invention includes obtaining, by a camera settings manager executing on a processor subject to suspension of operation based on a power state of the information handling system, the context data; obtaining, by the camera settings manager, the management policies; generating, by the camera settings manager, a low power manager update using the context data and the management policies; and updating, by the camera settings manager, operation of a low power manager of the information handling system using the low power manager update.

In one aspect, a non-transitory computer readable medium in accordance with one or more embodiments of the invention includes computer readable program code, which when executed by a computer processor enables the computer processor to perform a method for managing operation of a camera of an information handling system using context data and management policies. The method includes obtaining, by a camera settings manager executing on a processor subject to suspension of operation based on a power state of the information handling system, the context data; obtaining, by the camera settings manager, the management policies; generating, by the camera settings manager, a low power manager update using the context data and the management policies; and updating, by the camera settings manager, operation of a low power manager of the information handling system using the low power manager update.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 3.1 shows a flowchart of a method of updating the operation of a low power manager in accordance with one or more embodiments of the invention.

FIG. 3.2 shows a flowchart of a method of implementing a low power manager update in accordance with one or more embodiments of the invention.

FIGS. 4.1-4.3 show diagrams of the operation of an example system over time in accordance with one or more embodiments of the invention.

DETAILED DESCRIPTION

Figure 1:
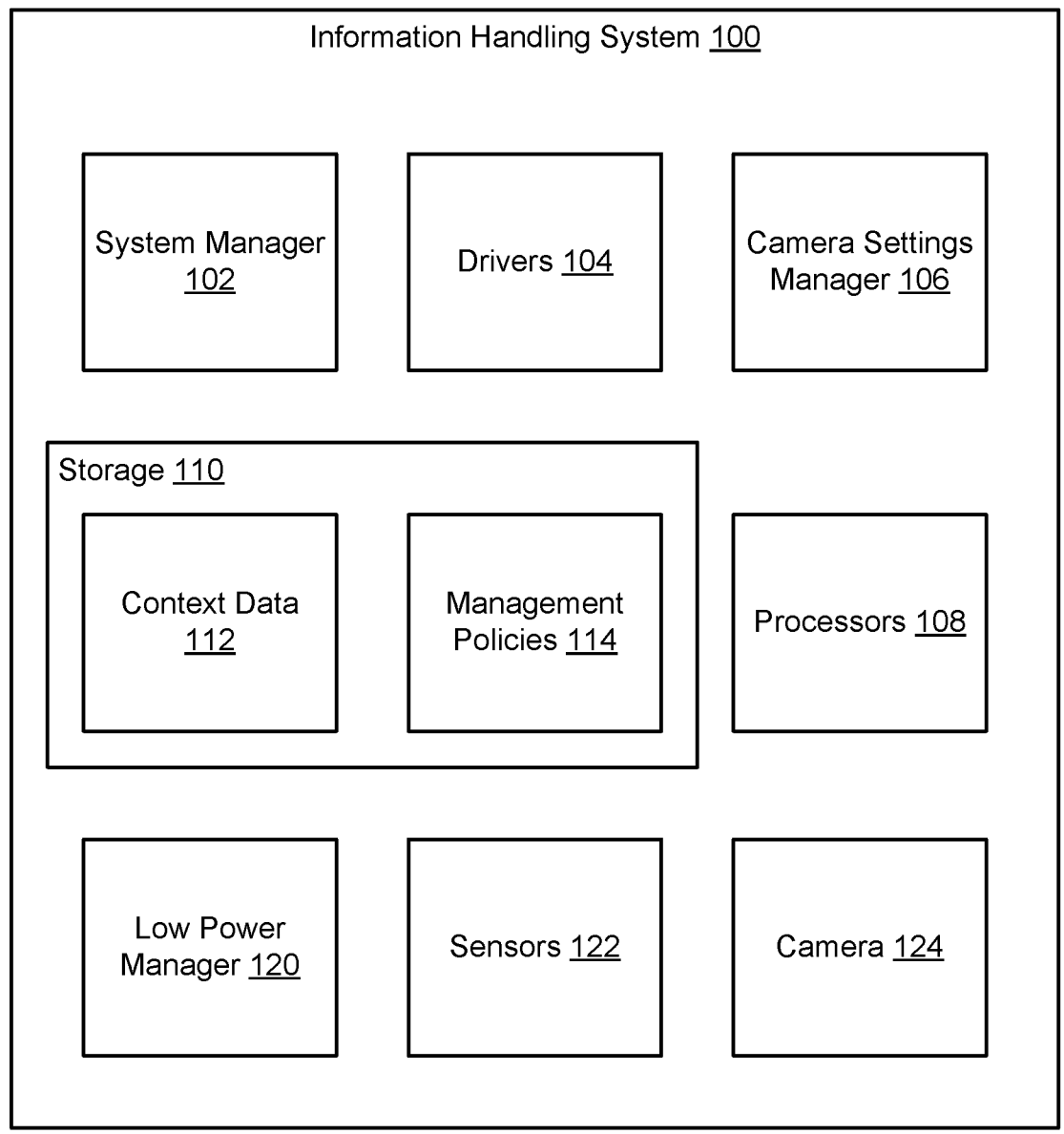
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to systems, devices, and methods for managing the operation of an information handling system. Specifically, embodiments of the invention may provide a method for managing a camera using a low power manager. The low power manager may operate separately from the other components of the information handling system and manage the operation of the camera even when other components of the information handling system are in low power states. For example, the low power manager may be implemented as a companion chip that operates alongside processors, memory, and/or other components that facilitate operation of the information handling system.

The low power manager may dynamically manage the camera in a manner that is consistent with the overall context of the information handling system. For example, the low power manager may take into account the operational state of the information handling system, the physical state of the information handling system, characteristics of an environment in which the information handling system resides, the geographic location of the information handling system, and/or preferences of users of the information handling system. By doing so, the information handling system may manage the operation of the camera in a manner that provides an improved user experience.

For example, the information handling system may be less likely to lock itself during undesirable periods of time, may automatically deactivate the camera when the information handling system is in location which may prohibit images of the locations from being taken, and/or may provide an improved level of response by ensuring that user sensing technology is consistently employed. The invention is not limited to the aforementioned examples.

FIG. 1 shows a system in accordance with one or more embodiments of the invention. The system may include one or more information handling systems (e.g., 100). The information handling system (100) illustrated in FIG. 1 may be representative of the other information handling systems (not shown) of the system.

The information handling system (100) may provide computer implemented services. The computer implemented services may include, for example, database services, data storage services, electronic communications services, and/or other types of services that may be implemented using information handling systems.

To provide computer implemented services, the information handling system (100) may include numerous hardware components including, for example, storage (110) for storing data, one or more processors (108) for performing computations, a camera (124) for obtaining information (which may be stored as data) regarding the environment around the information handling system (100), and any number of sensors (122) for obtain information. The information obtained by the sensors (122) may include any quantity and type of information. The information handling system (100) may include fewer, additional, and/or different hardware components without departing from the invention.

The information handling system (100) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the information handling system (100) described in this application and/or all, or a portion, of the methods illustrated in FIGS. 3.1-3.2. The information handling system (100) may be implemented using other types of computing devices without departing from the invention. For additional details regarding computing devices, refer to FIG. 5.

Operation of the hardware components of the information handling system (100) may consume electrical power. To reduce power consumption, the information handling system (100) may selectively reduce the power states of some of the hardware components when appropriate. For example, the information handling system (100) may place the processors (108), storage (110), sensors (122), or other components into low power states when the information handling system (100) anticipates that operation of these hardware devices will not be required to provide the computer implemented services.

When a hardware component is in a low power state (as opposed to another power state), the hardware component may not provide, or only provide a limit subset of, its functionalities. For example, when a processor is placed in a low power state, it may suspend execution of its workloads (e.g., computer instructions being executed by the processor), reduce execution rates, and/or otherwise operate in a manner that consumes a reduced amount of power while providing less than its nominal level of functionality. Consequently, while the processor is in the low power state, the information handling system (100) may suspend or reduce that rate at which computer implemented services are provided to users (e.g., persons operating the information handling system (100), other devices that have requested that the information handling system (100) perform a functionality, etc.) of the information handling system (100).

To provide a desirable quality of user experience, the information handling system (100) may utilize information obtained using the camera (124), information obtained using the sensors (122), and/or other types of information to make decision regarding how to operate the information handling system (100). For example, the information handling system (100) may use information obtained using the camera (124) and/or sensors (122) to determine when to place hardware components into low, nominal, or other power states. In another example, the information handling system (100) may use information obtained using the sensors (122) to determine when to disable one or more hardware components. In a further example, the information handling system (100) may use information regarding its operating state or operating states of its components (e.g., application, hardware devices, etc.) to determine how to operate the camera (124) and/or other hardware components.

However, because some of the hardware components of the information handling system (100) may not be able to provide their functionalities at all points in time for power management purposes (e.g., when processors are in low power states), programs or other types of entities executing/hosted using these hardware components may be unable to contribute to decisions regarding how to operate the information handling system (100) to provide a quality user experience.

For example, it may be desirable for the information handling system (100) to automatically transition the camera (124) from a low power to nominal power state when a latch or other mechanical locking mechanism monitored by a sensor (122) is actuated. If the processors (108) are in a low power state when the actuation is detected, a program or other entity dependent on the operation of the processors (108) for execution may not be able to initiate transition of the camera (124) from a low power to a high power state (e.g., by virtue of execution of the program being suspended).

To improve the likelihood that the information handling system (100) is able to modify its operation to provide a quality user experience at all points in time, the information handling system (100) may include a low power manager (120). The low power manager (120) may be a hardware component that provides, during operation of the information handling system (100), management services for the sensors (122), camera (124), and/or other types of hardware devices of the information handling system (100).

The management services may include, for example, (i) dynamically modifying the manner of operation of devices, (ii) reversibly disabling the devices, (iii) obtaining information (e.g., a data structure reflecting an image captured by the camera (124)) from the devices, and/or (iv) taking action based on the information obtained using the devices (e.g., causing the power states of devices to change).

The action taken by the low power manager (120) based on information obtained by the low power manager (120) may be able to be specified by other entities. For example, another entity such as an application hosted by the information handling system (100) may be able to program the low power manager (120) to perform certain types of actions in response to corresponding types of information or upon the occurrence of predetermined conditions. These information-action relationships may be implemented as policies (e.g., data structures) to which the low power manager (120) conforms its management services.

The action taken by the low power manager (120) may include, for example, (a) modifying the operation of hardware components, (b) disabling hardware components, (c) providing the information or derived information (e.g., analysis of data reflecting an image captured by the camera (124) and/or sensors (122)) to other entities (e.g., another hardware device and/or an application hosted by the information handling system (100)), and/or (d) initiating changes in power states of other components. The actions taken by the low power manager (120) may include additional, fewer, and/or different types of actions without departing from the invention.

In general, embodiments of the invention relate to methods and systems for managing the operation of low power managers (e.g., 120). Specifically, embodiments of the invention may enable the information handling system (100) to dynamically change the way in which the low power manager (120) provides its management services.

For example, the low power manager (120) may make decisions regarding how to provide its management services based on policies governing its operation. An information handling system in accordance with embodiments of the invention may modify these policies and/or other aspects regarding the operation of the information handling system (100) to change the manner in which the low power manager (120) provides management services. Consequently, the manner in which the low power manager (120) provides management services may dynamically change based on, for example, the states of applications hosted by the information handling system (100), the physical state of the information handling system (100), and/or other types of information which may not be accessible by the low power manager (120).

By doing so, an information handling system (100) in accordance with embodiments of the invention may provide an improved user experience, may consume less power, and/or may provide new functionalities customized to user preferences. For additional details regarding the low power manager (120), refer to FIG. 2.

To manage the operation of the low power manager (120), the information handling system (100) may include a camera settings manager (106). The camera settings manager (106) may dynamically modify the policies that govern the operation of the low power manager (120) and/or the operation of other components of the system (e.g., operation of the sensors (122), camera (124), and/or other devices).

The camera settings manager (106) may dynamically modify the policies that govern the operation of the low power manager (120) using data structures such as, for example, context data (112), management policies (114), and/or other types data structures that include information (e.g., application/hardware device state information, system state information, etc.) which may be used to determine how the low power manager (120) should operate. The camera settings manager (106) may use other information to modify the policies (and/or other types of data structures) that govern the operation of the low power manager (120) without departing from the invention.

When providing its functionality, the camera settings manager (106) may perform all, or a portion, of the methods illustrated in FIGS. 3.1-3.2.

The context data (112) may include any type and quantity of data that may be relevant for determine how to dynamically modify the policies that govern the operation of the low power manager (120). The context data (112) may include information obtained from any number of sources.

In one or more embodiments of the invention, the context data (112) includes: (i) information regarding the states of the hardware components of the information handling system (100) (e.g., power state, operating state, device types, identification information, states of the sensors (122), state of the camera (124), etc.), (ii) information regarding the software states of the software components of the information handling system (e.g., operating states of applications hosted by the information handling system (100), operating state of management entities (e.g., operating systems, drivers, etc.) of the information handling system (100), etc.), (iii) information regarding the location of the information handling system (100) (e.g., geographic location, location within a network environment, or other types of discriminating the location of the information handling system (100) from other locations), (iv) information regarding the environment in which the information handling system is disposed (e.g., light level, temperature level, or other information obtained using the sensors (122) and/or other devices such as other devices that are operably connected to the information handling system (100)), (v) information regarding who is using the information handling system, and/or other types of information that may be used to determine how the low power manager (120) should operate. The context data (112) may include additional, less, and/or different information without departing from the invention.

The management policies (114) may include information regarding how one or more users of the information handling system (100) desires the information handling system (100) to operate. For example, the management policies (114) may specify whether each of the users of the information handling system desires the information handling system to automatically wake upon detection of the user's face (e.g., detection using the camera), whether the information handling system should lock when the information handling system detects an absence of the user, whether to disabling locking of the information handling system (e.g., due to time outs) when the system believes that the user is present, whether the information handling system should limit activity of the camera/sensors/other hardware components while the information handling system is disposed in predetermined locations, preferences of the users regarding modification of power states of components of the system (e.g., whether the user prefers that the system discontinue use of the camera when the camera is unlikely to be able to detect the presence of the user), whether the system should modify the operation of the system based on the operating state of various hardware and/or software components of the system (e.g., whether time out durations should be extended when the system is operating in presentation mode), etc. The management policies (114) may include additional, less, and/or different data without departing from the invention.

The management policies (114) may include information obtained from any number of sources.

The context data (112) and management policies (114) may be obtained and/or maintained via any method without departing from the invention. For example, one or more entities (e.g., the camera settings manager (106)) hosted by the information handling system may obtain the information included in these data structures. In another example, the aforementioned data structures may be obtained entirely, or in part, from another device (e.g., a cloud service in which some of the management policies (114) are stored for a user).

The context data (112) and the management policies (114) may be implemented using any number and type of data structures including, for example, lists, tables, linked lists, unstructured data, databases, etc. The aforementioned data structures may be stored, entirely or in part, locally in storage (110) and/or remotely in other devices.

In one or more embodiments disclosed herein, the storage (110) is implemented using physical devices that provide data storage services (e.g., storing data and providing copies of previously stored data). The devices that provide data storage services may include hardware devices and/or logical devices. For example, storage (110) may include any quantity and/or combination of memory devices (i.e., volatile storage), long term storage devices (i.e., persistent storage), and/or other types of hardware devices that may provide short term and/or long term data storage services, and/or logical storage devices (e.g., virtual persistent storage/virtual volatile storage).

For example, the storage (110) may include a memory device (e.g., a dual in line memory device) in which data is stored and from which copies of previously stored data are provided. In another example, the storage (110) may include a persistent storage device (e.g., a solid-state disk drive) in which data is stored and from which copies of previously stored data is provided. In a still further example, the storage (110) may include: (i) a memory device (e.g., a dual in line memory device) in which data is stored and from which copies of previously stored data are provided, and (ii) a persistent storage device that stores a copy of the data stored in the memory device (e.g., to provide a copy of the data in the event that power loss, or other issues with the memory device that may impact its ability to maintain a copy of the data, cause the memory device to lose the data).

The storage (110) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices. A general storage does not include computer instructions in isolation from any physical storage devices.

The information handling system (100) may also include a system manager (102) and drivers (104).

The system manager (102) may manage the general operation of the information handling system (100). When managing the operation of the information handling system (100), the system manager (102) may allocate and/or facilitate access to the hardware resources of the information handling system (100). For example, applications or other entities hosted by the information handling system (100) may make calls to the system manager (102) thereby securing resources for use by the applications.

The system manager (102) may also manage the power state and/or other operating states of the hardware and/or software components of the information handling system. When making such management decisions, the system manager (102) may obtain information from the low power manager (120).

For example, to reduce power consumption by the information handling system (100), the system manager may place processors (108) or other hardware components of the information handling system (100) into low power states, thereby suspending or limiting execution of applications hosted by the information handling system (100). The system manager (102) may then rely on the low power manager (120) to provide information indicating that the power states of the processors (108) should be returned to nominal states (e.g., upon detection of the presence of a user using the camera (124)). Upon obtaining such information from the low power manager (120), the system manager (102) may modify the power states of the processors (108) to nominal power states thereby resuming nominal execution of applications hosted by the information handling system (100).

The drivers (104) may facilitate use of the hardware components of the information handling system (100). The drivers (104) may provide a layer of abstraction with respect to one or more hardware components of the information handling system (100) that reduces the complexity of use of the hardware components by other entities such as the system manager (102).

For example, the drivers (104) may include a driver that abstracts interactions with the low power manager. The abstraction provided by the driver may simplify the requirements for interacting with the low power manager thereby enabling the system manager (102), camera settings manager (106), and/or other entities of the information handling system (100) to more easily interact with the low power manager (120) and/or other hardware components (e.g., sensors, camera) of the information handling system (100).

While not illustrated in FIG. 1, the information handling system (100) may also host any number of applications that provide computer implemented services to users of the information handling system and/or other devices operably connected to the information handling system. These services may include, for example, instant messaging services, electronic communication services, database services, document processing services, and/or any number and type of services.

By dynamically modifying the operation of the low power manager (120), the information handling system (100) may dynamically change the manner in which it provides these computer implemented services. Consequently, the information handling system (100) may modify the manner in which it provides computer implemented services in a manner that improves the experience of users of the information handling system (100).

The components of the information handling system (100) illustrated in FIG. 1 may be implemented using any number and type of physical devices.

In one or more embodiments of the invention, the system manager (102), drivers (104), and/or camera settings manager (106) are implemented using a hardware device including circuitry. The hardware device may be, for example, a digital signal processor, a field programmable gate array, or an application specific integrated circuit. The circuitry may be adapted to cause the hardware device to perform the functionality of the system manager (102), drivers (104), and/or camera settings manager (106). The system manager (102), drivers (104), and/or camera settings manager (106)

may be implemented using other types of hardware devices without departing from the invention.

In one or more embodiments of the invention, the system manager (102), drivers (104), and/or camera settings manager (106) is implemented using a processor (e.g., 108) adapted to execute computing code stored on a persistent storage that when executed by the processor performs the functionality of the system manager (102), drivers (104), and/or camera settings manager (106). The processor may be a hardware processor including circuitry such as, for example, a central processing unit or a microcontroller. The processor may be other types of hardware devices for processing digital information without departing from the invention.

As used herein, an entity that is programmed to perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified or specifically designed) to perform the function. An entity that is programmed to perform a function does not include computer instructions in isolation from any hardware devices. Computer instructions may be used to program a hardware device that, when programmed, provides the function. For example, the hardware device may be operably connected to a persistent storage in which the computer instructions corresponding to the function are stored.

In one or more embodiments of the invention, the low power manager (120) is implemented using a hardware device including circuitry. The low power manager (120) may be implemented as a system on a chip. A system on a chip may be a hardware device that is able to operate independently of other components. For example, a system on a chip may include independent processing, memory, storage, and communication resources that enable it to provide computer implemented services without relying on other components.

In one or more embodiments of the invention, the sensors (122) are implemented using any number of physical devices. The physical devices may be any type and quantity of physical devices that are able to obtain information regarding the physical state of the information handling system (100), the environment in which the information handling system (100) resides, the location of the information handling system (100), and/or other types of information. The sensors may include, for example, global positioning system sensors that are able to ascertain the physical location of the information handling system (100), light sensors, closure sensors or other types of sensors able to determine the physical configuration of the information handling system (e.g., able to determine if the information handling system (100) is closed if implemented as a laptop computer), etc.

In one or more embodiments of the invention, the camera (124) is implemented as a physical device. The camera (124) may include a charge coupled device or other type of sensor able to generate digital images of an environment proximate to the information handling system (100).

The hardware components of the information handling system (100) may be operably connected to each other using any interconnection technology. For example, the processors (108), low power manager (120), sensors (122), camera (124), and/or other hardware devices not illustrated in FIG. 1 may be interconnected via one or more data buses. The data buses may implement any number and type of communication protocols.

While the information handling system (100) has been illustrated and described as including a limited number of specific components, an information handling system in accordance with embodiments of the invention may include additional, fewer, and/or different components from those illustrated and described without departing from the invention.

Figure 2:
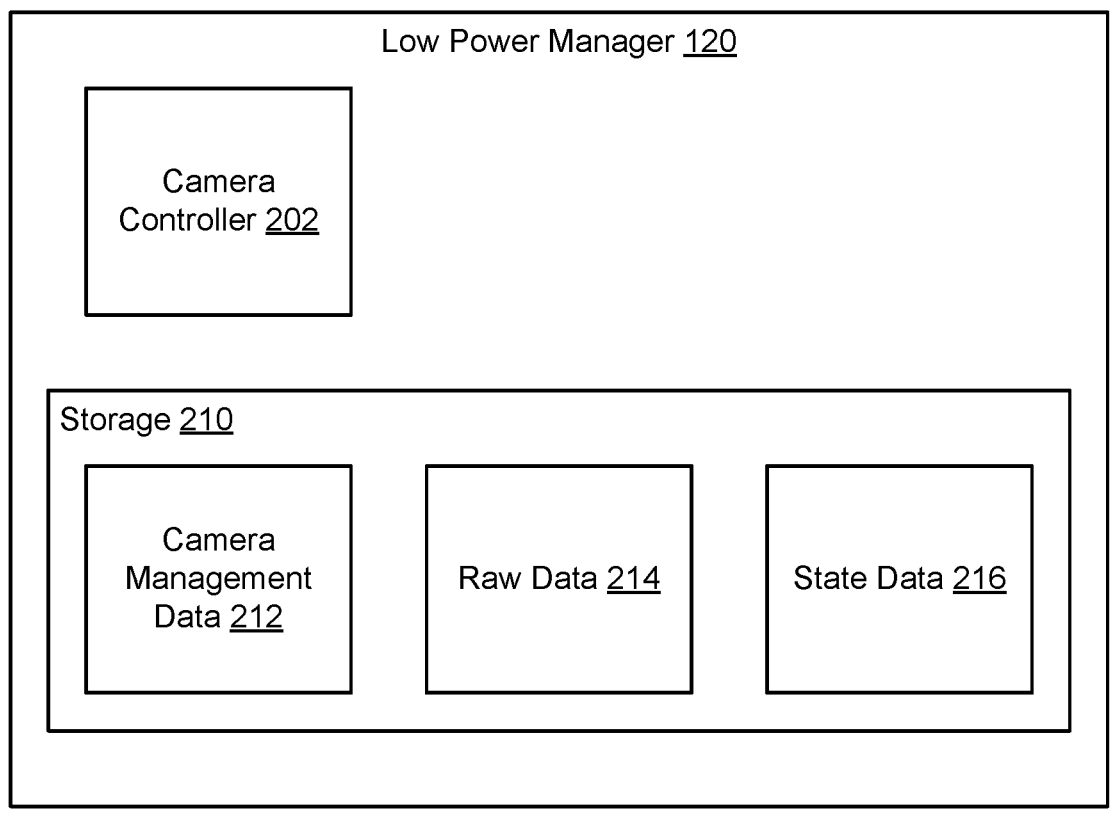
FIG. 2 shows a diagram of a low power manager in accordance with one or more embodiments of the invention.

As discussed above, an information handling system may include a low power manager. FIG. 2 shows a diagram of a low power manager (120) in accordance with one more embodiments of the invention.

The low power manager (120) may provide management services. Management services may include performing actions based on (i) information obtained from cameras, (ii) information obtained from sensors, and/or (iii) information obtain from other entities such as camera managers.

To provide the above noted functionality, the low power manager (120) may include a camera controller (202) and a storage (210). Each of these components is discussed below.

The camera controller (202) may provide the management services provided by the low power manager (120). To do so, the camera controller (202) may obtain information from cameras and/or sensors (e.g., raw data (214)), process the information to obtain derived information (e.g., state data (216), and take action based on information-action relationships).

Additionally, the camera controller (202) may modify the operation of the camera and/or sensors. For example, the camera controller (202) may modify the settings and/or firmware of the camera and/or sensors to modify the operation of these hardware devices. The camera controller (202) may modify the operation of these hardware devices based on instructions provided by a camera manager.

In one or more embodiments of the invention, the camera controller (202) is implemented using a hardware device including circuitry. The hardware device may be, for example, a digital signal processor, a field programmable gate array, or an application specific integrated circuit. The circuitry may be adapted to cause the hardware device to perform the functionality of the camera controller (202). The camera controller (202) may be implemented using other types of hardware devices without departing from the invention.

In one or more embodiments of the invention, the camera controller (202) is implemented using a processor (e.g., 108, FIG. 1) adapted to execute computing code stored on a persistent storage that when executed by the processor performs the functionality of the camera controller (202). The processor may be a hardware processor including circuitry such as, for example, a central processing unit or a microcontroller. The processor may be other types of hardware devices for processing digital information without departing from the invention.

When providing its functionality, the camera controller (202) may utilize data structures stored in the storage (210). In one or more embodiments disclosed herein, the storage (210) is implemented using physical devices that provide data storage services (e.g., storing data and providing copies of previously stored data). The devices that provide data storage services may include hardware devices and/or logical devices. For example, storage (210) may include any quantity and/or combination of memory devices (i.e., volatile storage), long term storage devices (i.e., persistent storage), and/or other types of hardware devices that may provide short term and/or long term data storage services, and/or logical storage devices (e.g., virtual persistent storage/virtual volatile storage).

For example, the storage (210) may include a memory device (e.g., a dual in-line memory device) in which data is stored and from which copies of previously stored data are provided. In another example, the storage (210) may include a persistent storage device (e.g., a solid-state disk drive) in which data is stored and from which copies of previously stored data is provided. In a still further example, the storage (210) may include: (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (210) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices. A general storage does not include computer instructions in isolation from any physical storage devices.

The storage (210) may store data structures including camera management data (212), raw data (214), and state data (216). Each of these data structures is discussed below.

The camera management data (212) may be implemented using one or more data structures that includes information regarding how a camera is to operate and/or actions that are to be performed in response to information obtained from the camera. For example, the camera management data (212) may include information-action relationships (e.g., policies) that specify actions to be performed by the low power manager (120) in response to predetermined data obtained from the camera.

The information-action relationships may specify, for example, that a system manager is to be notified when a user is detected in an image, that a camera should continue to operate and whether the image data provided by the camera should be analyzed, a duration of time during which the low power manager should continue to analyze image data to attempt to detect the presence of a user, whether the low power manager should enable or disable the camera, etc. These information-action relationships may be dynamically modified by a camera manager using information to which the lower power manager does not have access. Consequently, the resulting management behavior of the low power manager may reflect decisions made based on information beyond that to which the low power manager is able to access.

In addition to the information-action relationships, the camera management data (212) may also include settings for operation of the camera and/or firmware for the camera.

The camera management data (212) may be updated dynamically by the camera manager. For example, the camera manager may provide updates of the camera management data (212) to the low power manager (120). Once updated, the camera controller (202) may manage the operation of the camera in accordance with the camera management data (212).

The raw data (214) may be implemented using one or more data structures that include information obtained from the camera and/or sensors. For example, raw data (214) may include one or more images generated by the camera.

The state data (216) may be implemented using one or more data structures that include information derived from the raw data (214). For example, the camera controller (202) may perform one or more algorithms for ascertaining information from the raw data (214) (e.g., image recognition, user detection, etc.). The ascertained information may be stored in the state data (216).

The state data (216) may specify, for example, whether a user is present, an environmental condition (e.g., ambient light level), or any other type of information that may be derived from information obtained from a camera and/or sensor.

The information-response relationships of the camera management data (212) may include at least one information-response relationship that is keyed to information that may be stored in the state data (216). For example, the information-response relationships may specify that a system manager or other entities is to be notified when a user is present. Such information may be stored in the state data (216).

The data structures stored in the storage (210) may be implemented using, for example, lists, tables, linked lists, databases, unstructured data, or any other type of data structure.

While the low power manager (120) has been illustrated and described as including a limited number of specific components, a low power manager in accordance with embodiments of the invention may include additional, fewer, and/or different components from those illustrated and described without departing from the invention.

As discussed above, the system of FIG. 1 may manage the operation of a camera by dynamically modifying the programming of a low power manager. FIGS. 3.1-3.2 show methods that may be performed by components of the system of FIG. 1 to manage the operation of a camera and/or other hardware devices to provide quality user experiences.

FIG. 3.1 shows a flowchart of a method in accordance with one or more embodiments of the invention. The method depicted in FIG. 3.1 may be performed to update the operation of a low power manager in accordance with one or more embodiments of the invention. The method shown in FIG. 3.1 may be performed by, for example, a camera setting manager (e.g., 106, FIG. 1). Other components of the system in FIG. 1 may perform all, or a portion, of the method of FIG. 3.1 without departing from the invention.

While FIG. 3.1 is illustrated as a series of steps, any of the steps may be omitted, performed in a different order, additional steps may be included, and/or any or all of the steps may be performed in a parallel and/or partially overlapping manner without departing from the invention.

In step 300, context data for the information handling system is obtained. The context data may be stored in the information handling system and may be updated by the information handling system to make it more likely that it reflects the state of the information handling system.

The context data may specify, for example, a location of the information handling system, a mode of operation of the information handling system, and a physical state of the information handling system. The context data may include additional, less, and/or different information without departing from the invention.

In step 302, management policies for a camera of the information handling system are obtained.

In one or more embodiments of the invention, the management policies specify whether a camera is to continue to be operated and whether information from the camera is to continue to be operated while the information handling system is in a predetermined physical state. The predetermined physical state may be one in which it is unlikely that the camera will be able to obtain relevant data. The predetermined physical state may be one in which the field of view of the camera is restricted by another structure. The predetermined physical state may be when the information handling system is physically closed if the information handling system is implemented as a laptop or other form factor having multiple physical states (e.g., open, closed, in between, etc.).

In one or more embodiments of the invention, the management policies specify that the camera is to be disabled in one or more physical locations. The physical locations may correspond to any number and type of locations without departing from the invention.

In one or more embodiments of the invention, the management policies specify operating goals for the camera while the information handling system has corresponding operating states. For example, the information handling system may have, at least, a nominal operating state and a presentation operating state. During the nominal operating state, the operating goal for the camera may include a wait time for detection of a user using the camera of a predetermined duration. In contrast, during the presentation operating state, the operating goal for the camera may include a wait time for detection of the user using the camera of a second predetermined duration that is longer than the predetermined duration during the nominal operating state.

As noted above, the management policies for the camera may be obtained from any number and type of management policies that govern the overall operation of the information handling system. Consequently, some of the management policies for the camera may be derived from other, broader policies that specify goals to be achieved by the information handling system rather than policies specific to the camera.

In step 304, a low power manager update is obtained using the context data and the management policies.

In one or more embodiments of the invention, the low power manager update is implemented using one or more data structures that specify changes to how a camera is to be managed. The low power manager update may specify, for example, changes to the operation parameters of the camera such as the frame rate of image capture, changes to the analysis of the images captured by the camera such as a number of faces to be communicated or the rate at which captured images are analyzed (e.g., only analyzing a subset of the images captured using the camera, etc.). The low power manager update may specify, for example, that the camera is to be rendered inaccessible or is to be rendered accessible.

The low power manager update may be generated by comparing the context data to the camera management policies. The camera management policies may be keyed to information included in the context data.

For example, as noted with respect to step 302, the camera management policies may specify one or more physical locations where the camera is to be disabled. That camera management policy may be compared to the location of the information handling system included in the context data to determine if the camera should be enabled. The low power manager update may be obtained by adding information reflecting that determination to the low power manager update.

In another example, the camera management policies may specify that a longer duration of time for detection of a user prior to entering a locked state is to be employed when the information handling system is in a presentation mode (in contrast to a nominal operating mode). This camera management policy may be compared to the operating state of the information handling system included in the context data. If the determination indicates that a longer duration of time for detection should be employed, the low power manager update may be modified to specify that the low power manager should continue to analyze data obtained from the camera for the longer duration of time prior to notifying the system manager that a user is not present.

In step 306, the operation of the low power manager is updated using the low power manager update.

The operation of the low power manager may be updated by providing the low power manager update to the low power manager. The low power manager may update its camera management data (e.g., 212, FIG. 2) based on the low power manager update. Consequently, the low power manager and camera may begin to operate in accordance with the low power manager update (e.g., because the low power manager may change the settings of the camera to reflect the camera management data).

The method may end following step 306.

Using the method illustrated in FIG. 3.1, an information handling system in accordance with embodiments of the invention may dynamically modify the operation of a low power manager. Consequently, the information handling system may conform the operation of its camera and system through a low power manager to provide an improved user experience that takes into consideration information which is unavailable to the low power manager.

FIG. 3.2 shows a flowchart of a method in accordance with one or more embodiments of the invention. The method depicted in FIG. 3.2 may be performed to implement a low power manager update in accordance with one or more embodiments of the invention. The method shown in FIG. 3.2 may be performed by, for example, a low power manager (e.g., 120, FIG. 1). Other components of the system in FIG. 1 may perform all, or a portion, of the method of FIG. 3.2 without departing from the invention.

While FIG. 3.2 is illustrated as a series of steps, any of the steps may be omitted, performed in a different order, additional steps may be included, and/or any or all of the steps may be performed in a parallel and/or partially overlapping manner without departing from the invention.

In step 310, a low power manager update is obtained. The low power manager update may be obtained from a camera settings manager. The low power manager update may be obtained from other entities without departing from the invention.

The low power manager update may specify one or more changes to camera management data (e.g., 212, FIG. 2).

In step 312, the low power manager update is implemented. The low power manager update may be implemented by modifying the camera management data based on the low power manager update. For example, the camera management data may be modified to implement the one or more changes specified by the low power manager update.

The low power manager may modify the operation of the camera to reflect the changes specified by the low power manager update. The low power manager may do so in response to obtaining the low power manager update.

To modify the operation of the camera, the low power manager may modify settings of the camera (e.g., change an image capture frame rate), may disable the camera, may enable the camera, or may otherwise modify the operation of the camera.

In some embodiments of the invention, the modifications of the operation of the camera may be conditional in that they may not be modified until a condition has occurred (e.g., an information-action relationship). Consequently, the changes specified by the low power manager update may not be implemented until the condition(s) specified by the low power manager update have occurred.

The method may end following step 312.

Using the method illustrated in FIG. 3.2, an information handling system in accordance with embodiments of the invention may utilize a low power manager to implement changes to the operation of a camera. By doing so, the changes to the operation of the camera may be implemented dynamically as the occurrence of conditions precedent to the changes occur. Further, the changes may reflect, in part, information to which the low power manager does not have access. Consequently, the resulting changes to the operation of the camera may better reflect higher level goals of the information handling systems and be based on a wider variety of information than those to which the lower power manager has access.

To further clarify embodiments of the invention, non-limiting examples are provided in FIGS. 4.1-4.3. FIGS. 4.1-4.3 show a system similar to that illustrated in FIG. 1 over time. For the sake of brevity, only a limited number of components of the system of FIG. 1 are illustrated in each of FIGS. 4.1-4.3.

Example

Consider a scenario, as illustrated in FIG. 4.1, in which an information handling system (400) is operating. To manage its operation, the information handling system (400) includes a camera settings manager (406). The camera settings manager (406) utilizes context data (412) and management policies (414) stored in a storage (410) to determine how to manage the operation of a low power manager (420).

The context data (412) includes information obtained from a number of sources, including a latch sensor (422), a location sensor (430, FIG. 4.2), and a presentation application (440, FIG. 4.3).

At a first point in time while a camera (424) of the information handling system (400) is operating, the latch sensor (422) identifies that a latch that it monitors has closed. The latch sensor (422), in step 1, generates a data structure reflecting that the latch is now closed. The latch being closed is associated in a change in the physical state of the information handling system (400) to one in which the information handling system (400) has closed thereby likely obscuring the field of view of the camera (424). Consequently, a system manager (not shown) updates the context data (412), in step 2, to indicate that the information handling system (400) is in a new, closed state.

In response to the change in the context data (412), the camera settings manager (406) identifies, in step 3, one of the management policies (414) corresponding to when the information handling system (400) is in the closed state. The identified management policy specifies that camera data is to continue to be analyzed even when the information handling system (400) is in a closed physical state.

In step 4, the camera settings manager (406) obtains a copy of the updated context data (412) corresponding to the new physical state and the identified management policy. For example, the copy of the aforementioned data may be placed into memory (not shown).

In step 5, the camera settings manager (406) generates a low power manager update indicating that the camera (424) is to continue to operate and that the low power manager (420) is to continue to operate even while the information handling system (400) is in the closed state.

In step 6, a copy of the low power manager update is provided to the low power manager (420). In response to the low power manager update, the low power manager (420) continues operation of the camera (424) while the information handling system (400) is in the closed state and continues to analyze the images captured using the camera (424) even though it is unlikely that relevant images are likely to be captured while the information handling system (400) is in the closed state.

However, because the camera (424) and low power manager (420) continue to operate while in the closed state, the low power manager (420) may automatically generate a notification when the information handling system (400) returns to an open state. Consequently, a user experience may be improved by removing the need for the user to notify the information handling system (400) that it is in an open state. For example, the low power manager (420) may automatically generate an update that causes the information handling system (400) to resume normal operation upon detection of a user being present in the field of view of the camera (424) when the information handling system (400) is opened.

Turning to FIG. 4.2, FIG. 4.2 shows a diagram of the information handling system at a second point in time. At the second point in time, the information handling system (400) is moved to a secure work location at a place of employment of the user of the information handling system (400). The user's place of employment maintains a secure work environment and requires that all of its employees do not take videos or photographs of the place of employment with termination as punishment for violating this workplace policy.

To comply with this policy, the user has modified the management policies (414) to include a particular policy that specifies that the camera (424) is to be disabled when the information handling system (400) is near the user's place of employment.

When the information handling system approaches the user's place of employment, at step 10, the location sensor (430) identifies that the location of the information handling system (400) is near the user's place of employment. The location sensor (430) generates a data structure reflecting that the location of the information handling system. Consequently, a system manager (not shown) updates the context data (412), in step 11, to indicate that the information handling system (400) is located near the user's place of employment.

In response to the change in the context data (412), the camera settings manager (406) identifies, in step 12, the management policy corresponding to the location of the user's employment.

In step 13, the camera settings manager (406) obtains a copy of the updated context data (412) corresponding to the new location of the information handling system and the management policy corresponding to the location of the user's employment. For example, the copy of the aforementioned data may be placed into memory (not shown).

In step 14, the camera settings manager (406) generates a low power manager update indicating that the camera (424) is to be disabled.

In step 15, a copy of the low power manager update is provided to the low power manager (420).

Based on the low power manager update, in step 16, the low power manager disables the camera (424).

By disabling the camera using the low power manager, the information handling system (400) is unable to take images or video that would violate the user's workplace policy. This process is transparent and automatic from the user's point of view thereby improving the user experience by removing the requirement for the user to manually or otherwise disable the ability of the information handling system (400) to obtain images while in the location corresponding to the user's workplace.

Turning to FIG. 4.3, FIG. 4.3 shows a diagram of the information handling system at a third point in time. At the third point in time, the information handling system (400) is going to be used to present information to work colleagues of the user and its camera (424) is fully operational. During the presentation, it is likely that the user will move in and out of the field of view of the camera (424). Consequently, if normal analysis of images provided by the camera continues during the presentation, the information handling system may improperly determine that the information handling system (400) should enter a power saving state.

To reduce the likelihood of the information handling system entering a power saving state while the user is giving a presentation, the user has modified the management policies (414) to include a policy that specifies that the information handling system should take additional time to ascertain whether a user is present prior to entering power saving mode while a presentation is being given.

When the presentation begins to be given, at step 20, the user activates a presentation application (440) to display the presentation. In response to activation of the presentation application (440), a system manager (not shown) updates the context data (412), in step 21, to indicate that the information handling system (400) has entered a presentation mode of operation.

In response to the change in the context data (412), the camera settings manager (406) identifies, in step 22, the management policy corresponding to the presentation mode of the information handling system (400).

In step 23, the camera settings manager (406) obtains a copy of the updated context data (412) corresponding to the presentation mode and the management policy corresponding to the presentation mode. For example, the copy of the aforementioned data may be placed into memory (not shown).

In step 24, the camera settings manager (406) generates a low power manager update indicating that the images generated by the camera (424) are to be analyzed for a longer duration of time prior to determining that (assuming no user is detected in the images) the information handling system (400) has been left unattended.

In step 25, a copy of the low power manager update is provided to the low power manager (420).

Based on the low power manager update the low power manager extends the time duration for analyzing images from the camera. Consequently, even though the user exits the frame of view of the camera for extended periods of the time, the low power manager (420) does not improperly conclude that the information handling system (400) has been left unattended.

Accordingly, the user experience has been improved by reducing the likelihood that improper determinations are made during presentations during which it is likely that a user will be outside of the frame of view of the camera (424) for extended durations of time.

End of Example

Thus, as illustrated in FIGS. 4.1-4.3, embodiments of the invention may provide a system that enables the operation of cameras and corresponding analysis to take into account additional information that provides an improved user experience.

Figure 5:
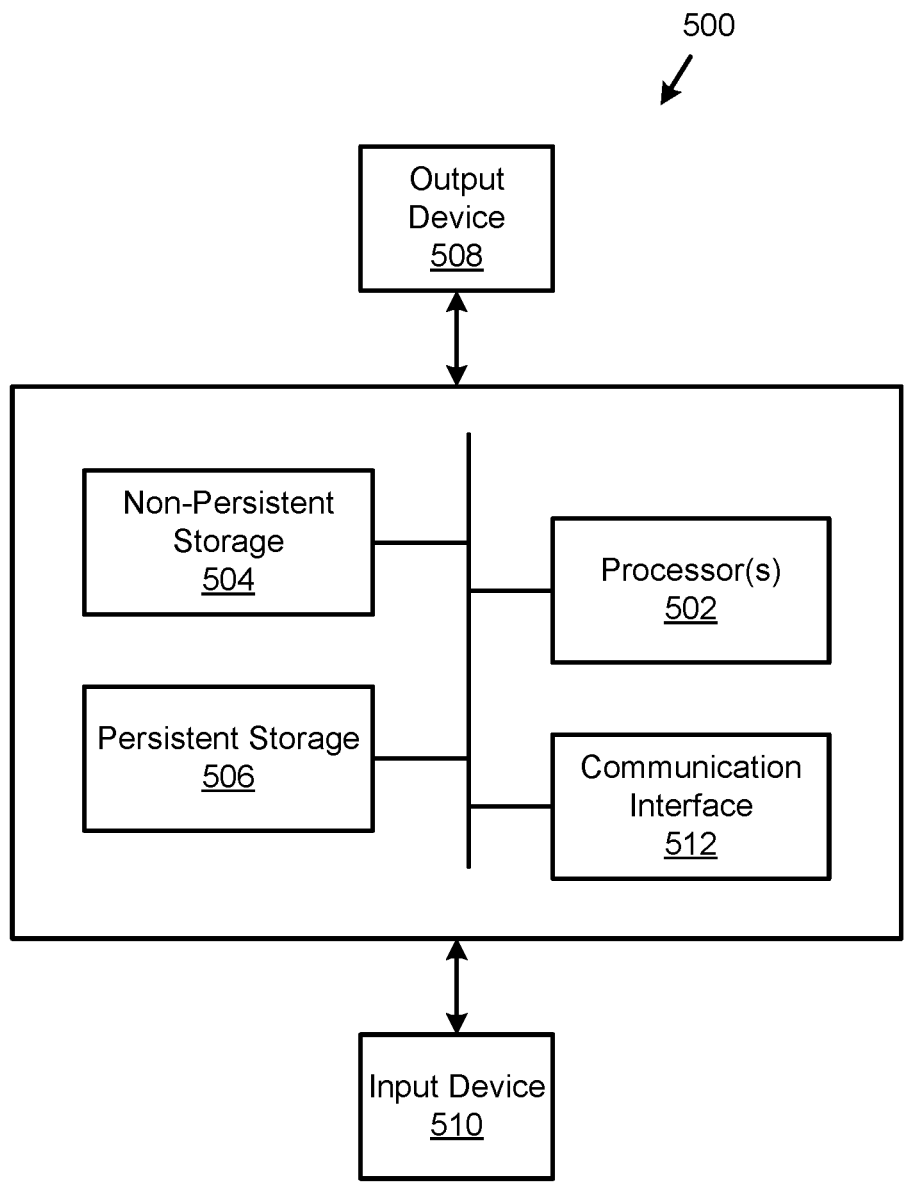
FIG. 5 shows a diagram of a computing device in accordance with one or more embodiments of the invention.

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

Embodiments of the invention may provide a system and method for managing hardware components of an information handling system. Specifically, embodiments of the invention may provide a system for dynamically managing the operation of cameras which improves user experiences by tailoring the operation of the cameras to context specific information.

Thus, embodiments of the invention may address the problem of undesirable device operation by modifying the operation of the devices based on the context of operation of the system as a whole.

The problems discussed above should be understood as being examples of problems solved by embodiments of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. An information handling system for providing computer implemented services to users, comprising:
   a camera;
   a low power manager that manages operation of the camera;
   a storage for storing:
     context data regarding an operating state of the information handling system, and management policies for managing operation of the camera; and
   a camera settings manager that dynamically updates operation of the low power manager using the context data and the management policies, wherein the camera settings manager is programmed to:
     obtain the context data, wherein the context data specifies that the information handling system is in a presentation mode of operation;
     obtain the management policies;
     generate a low power manager update using the context data and the management policies, wherein the low power manager update specifies that an amount of time in which a user is detected using the camera is increased; and
     update the operation of a low power manager using the low power manager update.

2. The information handling system of claim 1, further comprising:
   a system manager that manages a power state of the information handling system.

3. The information handling system of claim 2, wherein the system manager disables operation of the camera settings manager when the information handling system is in a low power state and enables the operation of the camera settings manager when the information handling system is in a nominal power state.

4. The information handling system of claim 3, wherein the low power manager continues to operate regardless of the power state of the information handling system.

5. The information handling system of claim 1, wherein the low power manager is adapted to:
   obtain image data using the camera;
   identify an alert using the image data; and
   modify a power state of the information handling system based on the alert.

6. The information handling system of claim 1, wherein the low power manager manages the operation of the camera by modifying firmware that defines the operation of the camera based on camera management data maintained by the low power manager.

7. The information handling system of claim 6, wherein dynamically updating the operation of the low power manager dynamically modifies the camera management data in response to changes in the context data.

8. The information handling system of claim 1, wherein the low power manager is a system on a chip comprising a processor executing code which provides the camera controller.

9. A method for managing operation of a camera of an information handling system using context data and management policies, comprising:
   obtaining, by a camera settings manager executing on a processor subject to suspension of operation based on a power state of the information handling system, the context data, wherein the context data specifies that the information handling system is in a presentation mode of operation;
   obtaining, by the camera settings manager, the management policies;
   generating, by the camera settings manager, a low power manager update using the context data and the management policies, wherein the low power manager update specifies that an amount of time in which a user is detected using the camera is increased; and
   updating, by the camera settings manager, operation of a low power manager of the information handling system using the low power manager update.

10. The method of claim 9, wherein updating the low power manager causes the low power manager to modify firmware of a camera of the information handling system.

11. The method of claim 9, wherein the low power manager operates regardless of the power state of the information handling system.

12. The method of claim 9, wherein the low power manager is a companion chip.

13. The method of claim 12, wherein the companion chip continues to operate during a low power state of the information handling system that suspends execution of entities using one or more processors of the information handling system.

14. A non-transitory computer readable medium comprising computer readable program code, which when executed by a computer processor enables the computer processor to perform a method for managing operation of a camera of an information handling system using context data and management policies, the method comprising:
   obtaining, by a camera settings manager executing on a processor subject to suspension of operation based on a power state of the information handling system, the context data, wherein the context data specifies that the information handling system is in a presentation mode of operation;
   obtaining, by the camera settings manager, the management policies;
   generating, by the camera settings manager, a low power manager update using the context data and the management policies, wherein the low power manager update specifies that an amount of time in which a user is detected using the camera is increased; and
   updating, by the camera settings manager, operation of a low power manager of the information handling system using the low power manager update.

15. The non-transitory computer readable medium of claim 14, wherein updating the low power manager causes the low power manager to modify firmware of a camera of the information handling system.

16. The non-transitory computer readable medium of claim 14, wherein the low power manager operates regardless of the power state of the information handling system.

17. The non-transitory computer readable medium of claim 14, wherein the low power manager is a companion chip.

\* \* \* \* \*